United States Patent
Dong et al.

(10) Patent No.: US 12,512,487 B2
(45) Date of Patent: Dec. 30, 2025

(54) FUEL CELL COOLING SYSTEM

(71) Applicants: HYUNDAI MOTOR COMPANY, Seoul (KR); KIA CORPORATION, Seoul (KR)

(72) Inventors: Hyun Bae Dong, Seoul (KR); Won Jung Kim, Seoul (KR); Ju Hae Jung, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 770 days.

(21) Appl. No.: 17/888,105

(22) Filed: Aug. 15, 2022

(65) Prior Publication Data
US 2023/0290965 A1 Sep. 14, 2023

(30) Foreign Application Priority Data

Mar. 8, 2022 (KR) .................. 10-2022-0029657

(51) Int. Cl.
| H01M 8/04029 | (2016.01) |
| H01M 8/04007 | (2016.01) |
| H01M 8/04119 | (2016.01) |
| H01M 8/04701 | (2016.01) |

(52) U.S. Cl.
CPC ... *H01M 8/04029* (2013.01); *H01M 8/04067* (2013.01); *H01M 8/04141* (2013.01); *H01M 8/04164* (2013.01); *H01M 8/04723* (2013.01)

(58) Field of Classification Search
CPC ......... H01M 8/04029; H01M 8/04067; H01M 8/04141; H01M 8/04164; H01M 8/04373; H01M 8/04358; H01M 8/04723; H01M 8/04768
See application file for complete search history.

(56) References Cited

U.S. PATENT DOCUMENTS

| 8,241,805 B2 | 8/2012 | Ueda et al. | |
| 2012/0328964 A1* | 12/2012 | Urata ................ | H01M 8/04417 |
| | | | 429/414 |

FOREIGN PATENT DOCUMENTS

| CN | 213782048 | * | 7/2021 |
| EP | 1333518 | * | 8/2011 |
| JP | 2007-234361 | * | 9/2007 |
| KR | 2010-0096814 A | | 9/2010 |
| KR | 10-1983815 B1 | | 5/2019 |

OTHER PUBLICATIONS

English translation of JP Publication 2007-234361, Sep. 2007.*
English translation of CN Publication 213782048, Jul. 2021.*

* cited by examiner

*Primary Examiner* — Brittany L Raymond
(74) *Attorney, Agent, or Firm* — MCDONNELL BOEHNEN HULBERT & BERGHOFF LLP

(57) ABSTRACT

A fuel cell cooling system may include a fuel cell module including a fuel cell stack, a cooling module that includes a cooling tower in which cooling fluid is accommodated and adjusts a temperature of the fuel cell module, a heat exchanger that exchanges heat between first circulation cooling water circulating in the fuel cell module and second circulation cooling water circulating in the cooling tower, and a condensate supply line connected to the cooling tower to supply, to the cooling tower, water generated in a power generation process of the fuel cell module.

10 Claims, 3 Drawing Sheets

FUEL CELL COOLING SYSTEM

CROSS REFERENCE TO RELATED APPLICATIONS

This application claims the benefit of priority to Korean Patent Application No. 10-2022-0029657, filed in the Korean Intellectual Property Office on Mar. 8, 2022, the entire contents of which are incorporated herein by reference.

TECHNICAL FIELD

The present disclosure relates to a fuel cell cooling system.

BACKGROUND

A fuel cell power generation system is a device for generating electric energy while receiving oxygen and hydrogen that is a fuel and generating water and includes a fuel cell stack in which an electrochemical reaction occurs. The fuel cell stack generates thermal energy by an electrochemical reaction, and when the temperature of the fuel cell stack deviates from a normally operable range, the efficiency of the system is rapidly degraded. Thus, a cooling system is used to maintain the temperature of the fuel cell stack within a normal range.

In a cooling system according to the related art, a cooling tower is provided to cool cooling water circulating inside the cooling tower by using evaporation latent heat generated during evaporation of cooling fluid accommodated therein, and to lower the temperature of the fuel cell stack through heat exchange with the cooled cooling water.

However, since the cooling fluid accommodated in the cooling tower is evaporated and reduced, the cooling fluid needs to be frequently supplied to the cooling tower. In the related art, a separate water supplying facility for supplying the cooling fluid to the cooling tower and supplying the cooling fluid to maintain a constant amount is installed. However, the installation cost and operation cost of the fuel cell power generation system increase due to the water supply facility.

Thus, improvement of a technology of minimizing costs of supplying the water while frequently supplying the cooling fluid to the cooling tower is required.

SUMMARY

The present disclosure has been made to solve the above-mentioned problems occurring in the prior art while advantages achieved by the prior art are maintained intact.

An aspect of the present disclosure provides a fuel cell cooling system in which water generated and discarded by a fuel cell module is supplied to a cooling tower and is recycled as a cooling fluid, and thus the cooling fluid is frequently supplied to the cooling tower.

Another aspect of the present disclosure provides a fuel cell cooling system in which costs for operating a fuel cell power generation system are reduced.

According to an aspect of the present disclosure, there is provided a fuel cell cooling system including a fuel cell module including a fuel cell stack, a cooling module that includes a cooling tower in which cooling fluid is accommodated and adjusts a temperature of the fuel cell module, a heat exchanger that exchanges heat between first circulation cooling water circulating in the fuel cell module and second circulation cooling water circulating in the cooling tower, and a condensate supply line connected to the cooling tower to supply, to the cooling tower, water generated in a power generation process of the fuel cell module.

The fuel cell cooling system may further include a wet air discharge line that discharges wet air generated by the fuel cell module, and an air exhaust line through which air in the wet air is exhausted, wherein the air exhaust line and the condensate supply line may branch off from the wet air discharge line.

The fuel cell cooling system may further include a condensate supplier including the condensate supply line, wherein the condensate supplier may further include a condensate pump that is provided on the condensate supply line and adjusts a flow rate of a condensate supplied to the cooling tower.

The fuel cell module may further include a first cooling water line through which the first circulation cooling water for adjusting a temperature of the fuel cell stack circulates, the cooling module may further include a second cooling water line through which second circulation cooling water cooled by the cooling fluid circulates, and the heat exchanger may be connected between the first cooling water line and the second cooling water line and exchange heat between the first circulation cooling water and the second circulation cooling water.

The fuel cell cooling system may further include a condensate supplier including the condensate supply line, wherein the condensate supplier may include a cooling tank that is installed on the condensate supply line and store water discharged from the fuel cell module, and a cooling pump that is provided on the condensate supply line, is provided between the cooling tank and the cooling tower, and adjusts a flow rate of the water supplied to the cooling tower.

The fuel cell cooling system may further include a controller that controls operation of the cooling pump, wherein the second cooling water line may include an inlet line provided such that the second circulation cooling water heat-exchanged by the heat exchanger is introduced into the cooling tower and having a first temperature sensor, and an outlet line provided such that the second circulation cooling water cooled by the cooling tower is discharged to the heat exchanger and having a second temperature sensor, and the controller may control the operation of the cooling pump in consideration of a difference value between a first temperature measured by the first temperature sensor and a second temperature measured by the second temperature sensor.

The controller may operate the cooling pump to supply the condensate to the cooling tower when the difference value between the first temperature and the second temperature deviates from a reference temperature range that is a preset temperature range.

The condensate supplier may further include a water level sensor that measures a water level of the condensate stored inside the cooling tank, and the controller may receive a signal measured by the water level sensor and control the cooling pump to be operated when the water level measured by the water level sensor exceeds a reference water level range that is a preset water level range.

The cooling tower may include a cooling fluid drain line which is formed at a predetermined height of the cooling tower and through which at least a portion of the cooling fluid is discharged to an outside of the cooling tower when a water level of the cooling fluid accommodated in the cooling tower exceeds a predetermined range.

The air exhaust line may include an upward extension line extending upward from the wet air discharge line, and two or more branching parts branching off to be inclined upward from an upper end of the upward extension part.

One end of the condensate supply line may be connected to the wet air discharge line and the other end thereof may be connected to the cooling water, and the other end of the condensate supply line may be formed at a height that is lower than the one end of the condensate supply line.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments suitable for understanding technical features of a fuel cell cooling system according to the present disclosure. However, the present disclosure is not limited to the embodiments described below, the technical features of the present disclosure are not limited by the described embodiments, and various modifications may be made within the technical scope of the present disclosure.

Figure 1:
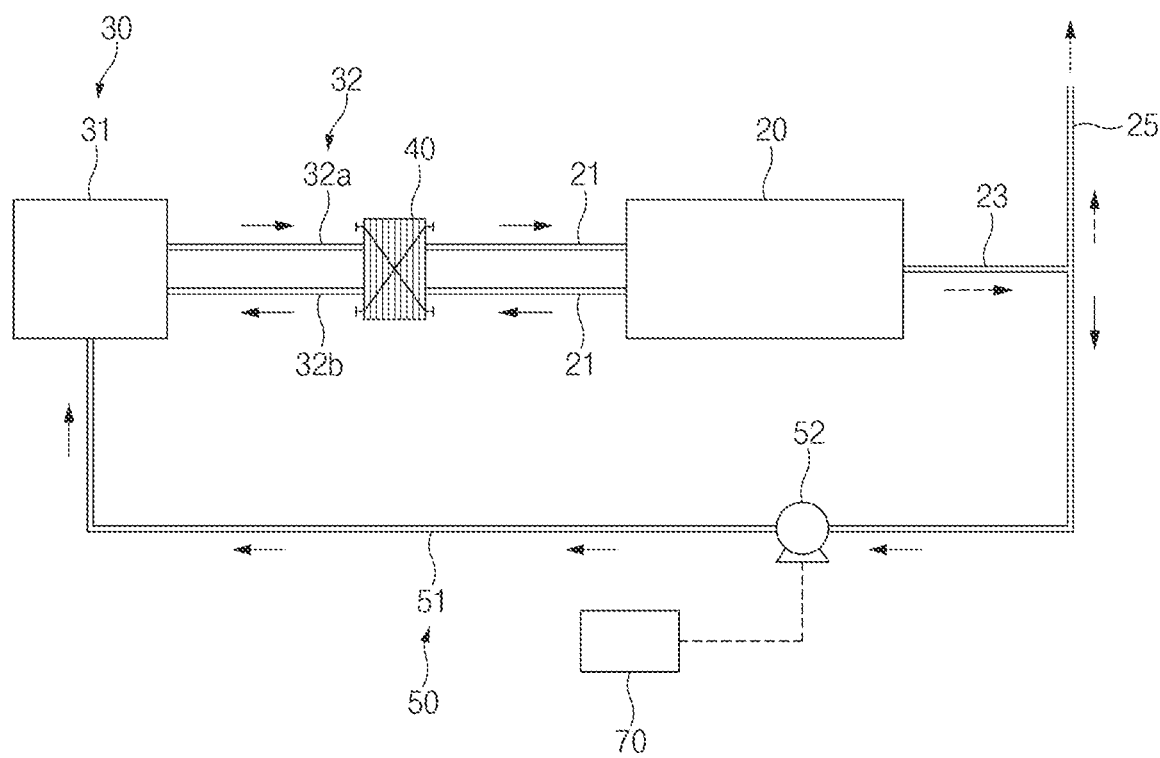
FIG. 1 is a schematic view illustrating a configuration of a fuel cell cooling system according to a first embodiment of the present disclosure.

FIG. 1 is a schematic view illustrating a configuration of a fuel cell cooling system according to a first embodiment of the present disclosure.

Referring to FIG. 1, a fuel cell cooling system 10 according to the first embodiment of the present disclosure includes a fuel cell module 20, a cooling module 30, a heat exchanger 40, and a condensate supply line 51.

The fuel cell module 20 includes a fuel cell stack. The fuel cell stack is a device that generates electric energy while hydrogen and oxygen electrochemically react with each other to generate vapor (water) and includes an anode and a cathode. The hydrogen supplied to the anode is separated into hydrogen ions and electrons by a catalyst of the anode, and the hydrogen ions pass through a polymer electrolyte membrane to the cathode. The oxygen supplied to the cathode is coupled to electrons input to the cathode through an external conducting wire to generate vapor (water) so as to generate electric energy.

The vapor generated in a power generation process of the fuel cell module 20 may be discharged to the outside. In more detail, the vapor generated in the fuel cell module 20 may be condensed, while discharged to the outside, to generate water.

Further, the fuel cell module 20 may further include a first cooling water line 21 through which a first circulation cooling water for adjusting the temperature of the fuel cell stack circulates. The first cooling water line 21 is a line through which the first circulation cooling water heat-exchanged with the fuel cell stack to cool the fuel cell stack circulates. The first cooling water line 21 may be provided with the fuel cell stack to enable the heat exchange and may have a structure in which the first circulation cooling water circulates.

The cooling module 30 includes a cooling tower 31 in which cooling fluid is accommodated and is provided to adjust the temperature of the fuel cell module 20. The cooling tower 31 may be directly or indirectly connected to the fuel cell module 20, and the liquid cooling fluid may be accommodated in the cooling tower 31. The cooling tower 31 may be configured to reduce the temperature of water circulating inside the cooling tower 31 using evaporation latent heat generated during evaporation of the cooling fluid. That is, since the cooling fluid accommodated in the cooling tower 31 is continuously evaporated and reduced, the cooling fluid needs to be frequently supplied to the cooling tower 31.

In detail, the cooling module 30 may further include a second cooling water line 32 through which a second circulation cooling water cooled by the cooling fluid circulates. The second cooling water line 32 may have a structure which is connected to the cooling tower 31 to enable the heat exchange and through which the second circulation cooling water circulates. The second circulation cooling water may serve to cool the first circulation cooling water through the heat exchanger 40, which will be described below. Further, the cooling tower 31 is provided to cool the second circulation cooling water of which the temperature is increased through the heat exchange with the first circulation cooling water. That is, the second circulation cooling water may be heated through the heat exchange with the first circulation cooling water, may be then cooled by the cooling tower 31, and may be supplied to the heat exchanger 40 again.

The heat exchanger 40 is provided such that the first circulation cooling water circulating in the fuel cell module 20 and the second circulation cooling water circulating the cooling tower 31 are heat-exchanged with each other.

In detail, the heat exchanger 40 may be provided between the first cooling water line 21 and the second cooling water line 32 so that the first circulation cooling water and the second circulation cooling water are heat-exchanged with each other. Heat generated in the fuel cell stack may be transferred to the first circulation cooling water through the heat exchange between the fuel cell stack and the first circulation cooling water, and the heat transferred to the first circulation cooling water may be transferred to the second circulation cooling water through the heat exchange between the first circulation cooling water and the second circulation cooling water in the heat exchanger 40.

In this process, the cooling module 30 may cool the first circulation cooling water to remove the heat generated in the fuel cell stack so as to maintain the temperatures of the fuel cell stack and the module constant. Accordingly, thermal management performance and durability of the fuel cell module 20 are improved.

The condensate supply line 51 is connected to the cooling tower 31 to supply, to the cooling tower 31, the water generated during the power generation process of the fuel cell module 20.

In detail, as described above, the vapor generated during the power generation process of the fuel cell module 20 is condensed while discharged to the outside, and thus water may be generated. Air in the vapor discharged from the fuel cell module 20 may be discharged to the outside, and the condensed water may be supplied to the cooling tower 31 through the condensate supply line 51. One end 51a of the condensate supply line 51 may be connected to the fuel cell module 20 through a wet air discharge line 23, which will be described below, and the other end 51b of the condensate supply line 51 may be connected to the cooling tower 31.

In more detail, the present disclosure may further include the wet air discharge line 23 provided to discharge wet air generated in the fuel cell module 20 and an air exhaust line 25 through which air in the wet air is exhausted.

Further, the air exhaust line 25 and the condensate supply line 51 may branch off from the wet air discharge line 23. For example, the air exhaust line 25 may extend upward from an end of the wet air discharge line 23 to exhaust the air, and the condensate supply line 51 may extend downward from the end of the wet air discharge line 23 to allow condensate to flow. Accordingly, some vapor that has moved through the air exhaust line 25 may be cooled while being exhausted and also move to the condensate supply line 51.

In this way, in the fuel cell cooling system 10 according to the present disclosure, the water generated in the fuel cell module 20 is supplied to the cooling tower 31 to be recycled as the cooling fluid, and thus the cooling fluid may be frequently supplied to the cooling tower 31.

Accordingly, according to the present disclosure, costs for water supply for operating the fuel cell power generation system may be reduced. That is, in the present disclosure, the water generated in the fuel cell module 20 is recycled, and thus costs for a separate water supply facility for supplying the cooling fluid to the cooling tower 31 may be minimized.

Meanwhile, referring to FIG. 1, the fuel cell cooling system 10 according to the present disclosure may further include a condensate supplier 50 including the condensate supply line 51. Further, the condensate supplier 50 may further include a condensate pump 52 and a controller 70.

The condensate pump 52 may be provided on the condensate supply line 51 and may be provided to adjust the flow rate of the condensate supplied to the cooling tower 31. Further, the controller 70 may function to control an operation of the condensate pump 52.

The controller 70 may control the condensate pump 52 to be operated in consideration of a cooling process of the fuel cell cooling system 10 so that the cooling fluid in the cooling tower 31 is not insufficient. Further, the controller 70 may control the operation of the condensate pump 52 to be stopped as needed.

The water generated in the fuel cell module 20 may be frequently supplied to the cooling tower 31 by the controller 70 and the condensate pump 52.

Figure 2:
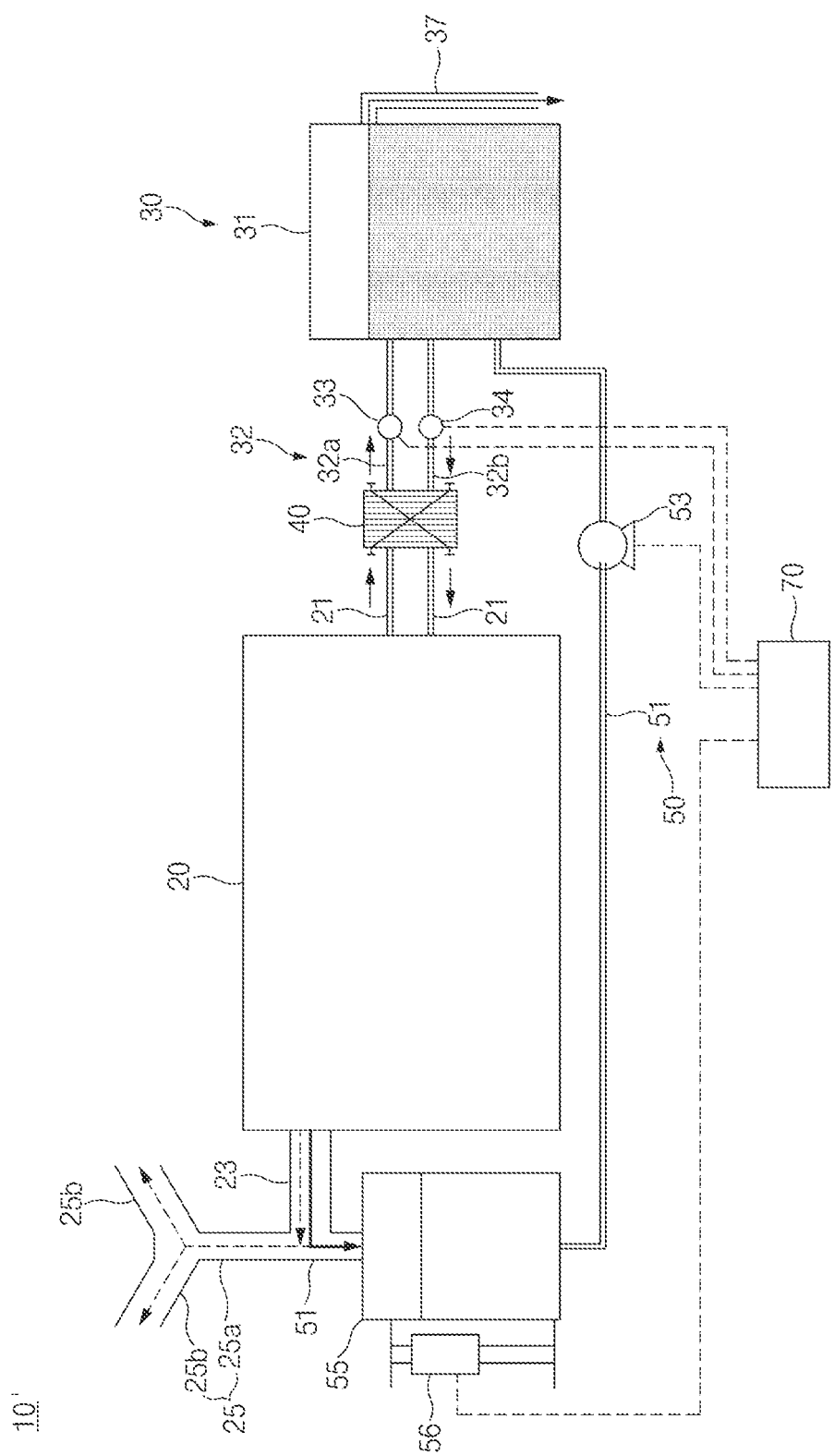
FIG. 2 is a schematic view illustrating a configuration of a fuel cell cooling system according to a second embodiment of the present disclosure.

Hereinafter, referring to FIG. 2, the fuel cell cooling system 10' according to a second embodiment of the present disclosure will be described. FIG. 2 is a schematic view illustrating a configuration of the fuel cell cooling system 10' according to a second embodiment of the present disclosure.

The fuel cell cooling system 10' according to the second embodiment of the present disclosure is different from that according to the first embodiment in that the air exhaust line 25 and the cooling module 30 are specified. Thus, the second embodiment of the present disclosure may include all the configurations of the first embodiment except for the above-described differences. For example, the second embodiment of the present disclosure may include the heat exchanger 40, the condensate supplier 50, and the controller 70.

The condensate supplier 50 according to the second embodiment of the present disclosure may include a cooling tank 55 and a cooling pump 53.

The cooling tank 55 may be installed on the condensate supply line 51 and may store the water discharged from the fuel cell module 20. The cooling tank 55 may serve to temporarily store the water moved through the condensate supply line 51. In the present disclosure, the required amount of the water may be supplied to the cooling tower 31 by the cooling tank 55.

The cooling pump 53 may be provided on the condensate supply line 51, provided between the cooling tank 55 and the cooling tower 31, and provided to adjust the flow rate of the water supplied to the cooling tower 31. Further, the controller 70 may function to control an operation of the cooling pump 53.

The controller 70 may control the operation of the cooling pump 53 in consideration of the cooling process of the fuel cell system so that the required amount of water is supplied to the cooling tower 31 from the cooling tank 55.

In detail, the second cooling water line 32 may include an inlet line 32a and an outlet line 32b. The inlet line 32a and the outlet line 32b are parts of the second cooling water line 32 and are lines divided with respect to the heat exchanger 40 and the cooling tower 31.

The inlet line 32a may be provided so that the second circulation cooling water heat-exchanged by the heat exchanger 40 is introduced into the cooling tower 31 and may have a first temperature sensor 33. The outlet line 32b may be provided so that the second circulation cooling water cooled in the cooling tower 31 is discharged to the heat exchanger 40 and may have a second temperature sensor 34.

The controller 70 may control the operation of the cooling pump 53 in consideration of a first temperature measured by the first temperature sensor 33 and a second temperature measured by the second temperature sensor 34.

In detail, when the cooling fluid in the cooling tower 31 is insufficient, the second circulation cooling water circulating in the cooling tower 31 may not be sufficiently cooled in the cooling tower 31. In this case, a difference between the temperature of the second circulation cooling water heated by the heat exchanger 40 and moved through the inlet line 32a and the temperature of the second circulation cooling water cooled by the cooling tower 31 and moved through the outlet line 32b may not be high.

Thus, the controller 70 may determine whether the cooling fluid in the cooling tower 31 is sufficient by comparing the temperature of the second circulation cooling water measured by the first temperature sensor 33 and the temperature of the second circulation cooling water measured by the second temperature sensor 34.

For example, when a difference between the first temperature and the second temperature deviates from a reference temperature range that is a preset temperature range, the controller 70 may determine that the cooling water in the cooling tower 31 is insufficient and control the condensate to be supplied to the cooling tower 31 by operating the cooling pump 53. Here, the reference temperature range is a value preset in the controller 70 and is a range of a difference value between the first temperature and the second temperature when the cooling fluid is not insufficient in the cooling tower 31.

The controller 70 may compare the difference value between the first temperature and the second temperature with the reference temperature range and operate the cooling pump 53 to supply the cooling fluid to the cooling tower 31 when the difference value between the first temperature and the second temperature is less than the reference temperature range. Further, when the cooling pump 53 is operated so that the difference value between the first temperature and the second temperature becomes within the reference temperature range, the controller 70 may stop the cooling pump 53.

Meanwhile, the condensate supplier 50 may further include a water level sensor 56 that measures the water level of the condensate stored inside the cooling tank 55. Types and installation locations of the water level sensor 56 are not limited as long as the water level sensor 56 may measure the water level of the condensate stored inside the cooling tank 55.

Further, the controller 70 may receive a signal measured by the water level sensor 56 and control the cooling pump 53 to be operated when the water level measured by the water level sensor 56 exceeds a reference water level range that is a preset water level range. Here, the reference water level range is a value preset in the controller 70 and is a water level of the condensate at which the condensate inside the cooling tank 55 is properly accommodated.

When the water level measured by the water level sensor 56 exceeds the reference water level range, the controller 70 may operate the cooling pump 53 to supply the condensate of the cooling tank 55 to the cooling tower 31. Further, when the water level measured by the water level sensor 56 becomes within the reference water level range due to the operation of the cooling pump 53, the controller 70 may stop the operation of the cooling pump 53.

Meanwhile, the cooling tower 31 may include a cooling fluid drain line 37. The cooling fluid drain line 37 may be formed at a predetermined height of the cooling tower 31 and may be provided such that at least a portion of the cooling fluid is discharged to the outside of the cooling tower 31 when the water level of the cooling fluid accommodated in the cooling tower 31 exceeds a predetermined range.

In detail, one end of the cooling fluid drain line 37 may be connected to the cooling tower 31, and the other end of the cooling fluid drain line 37 may be disposed outside the cooling tower 31. The other end of the cooling fluid drain line 37 may be connected to a sewer or the like to drain the cooling fluid.

Here, the one end of the cooling fluid drain line 37 is connected to a predetermined height of the cooling tower 31, and when the water level of the cooling fluid accommodated inside the cooling tower 31 reaches the predetermined height, the cooling fluid may be directly discharged through the cooling fluid drain line 37.

The water level of the cooling fluid inside the cooling tower 31 may be maintained within a predetermined height due to the cooling fluid drain line 37.

Meanwhile, the air exhaust line 25 may include an upward extension part 25a and a branching part 25b.

The upward extension part 25a may extend upward from the wet air discharge line 23. Further, the branching part 25b may be formed to be inclined upward from an upper end of the upward extension part 25a and may branch off into two or more parts at the upper end of the upward extension part 25a.

In detail, the air exhaust line 25 may be provided to extend upward to exhaust the air and may be divided into the upward extension part 25a extending upward and the branching part 25b inclined upward. For this reason, the vapor moving from the upward extension part 25a to the branching part 25b together with the air may be cooled and condensed while in contact with a branching portion of the branching part 25b, and the condensate may be lowered to move to the condensate supply line 51.

Due to the shape of the air exhaust line 25, the amount of generated condensate in the vapor may increase, and accordingly, the amount of recycled condensate may be maximized.

Figure 3:
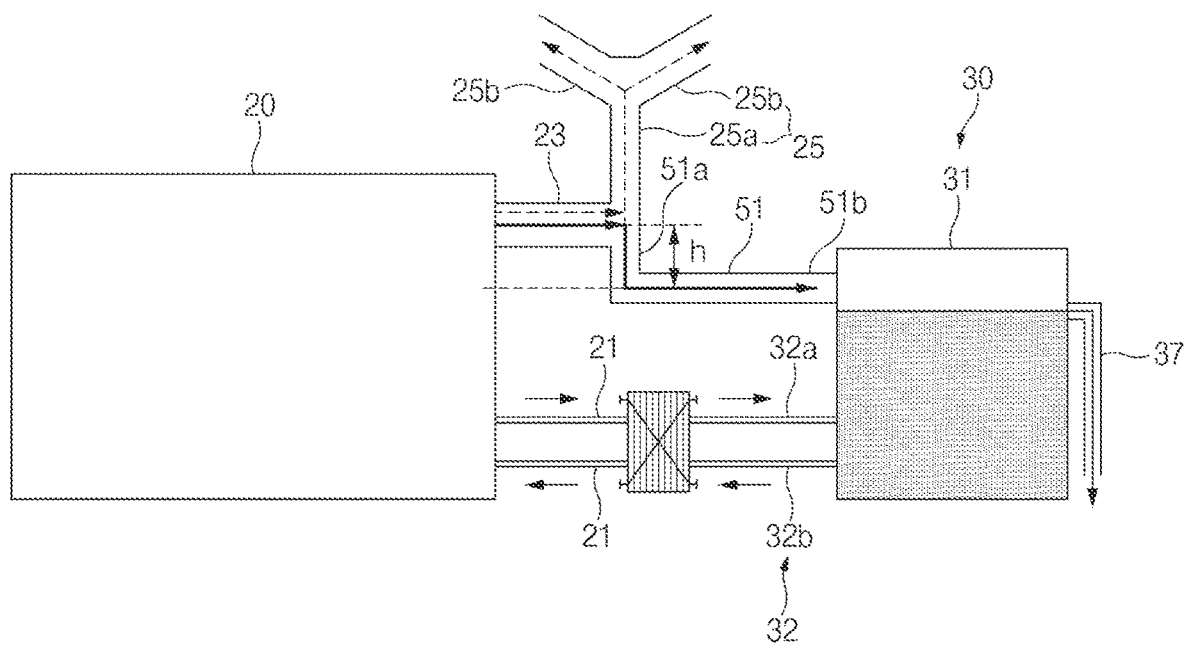
FIG. 3 is a schematic view illustrating a configuration of a fuel cell cooling system according to a third embodiment of the present disclosure.

Hereinafter, referring to FIG. 3, the fuel cell cooling system 10″ according to a third embodiment of the present disclosure will be described. FIG. 3 is a schematic view illustrating a configuration of the fuel cell cooling system 10″ according to a third embodiment of the present disclosure.

The fuel cell cooling system 10″ according to the third embodiment of the present disclosure is different from those according to the first and second embodiments in terms of a configuration of the condensate supply line 51. Thus, the third embodiment of the present disclosure may include all the configurations of the first and second embodiments except for the above-described difference. For example, the third embodiment of the present disclosure may include the heat exchanger 40, the condensate supplier 50, and the controller 70 and may include the configuration of the air exhaust line 25 and the cooling fluid drain line 37 included in the second embodiment.

In the third embodiment of the present disclosure, the one end 51a of the condensate supply line 51 may be connected to the wet air discharge line 23, and the other end 51b thereof may be connected to the cooling tower 31. Further, the other end 51b of the condensate supply line 51 may be formed at a height lower than the one end 51a of the condensate supply line 51.

In detail, in the third embodiment of the present disclosure, the water may be supplied to the cooling tower 31 due to the height difference between the one end 51a and the other end 51b of the condensate supply line 51 without a separate pump provided in the condensate supply line 51. Since the one end 51a of the condensate supply line 51 is formed to be higher than the other end 51b thereof, the condensate obtained by condensing the vapor generated in the fuel cell module 20 always flows into the cooling tower 31 by gravity.

Accordingly, in the embodiment of the present disclosure, the condensate may be constantly supplied to the cooling tower 31 through the condensate supply line 51. Thus, a predetermined amount of the cooling fluid inside the cooling tower 31 may be maintained.

In the fuel cell cooling system according to the present disclosure, the water generated and discarded by the fuel cell module is supplied to the cooling tower and is recycled into the cooling fluid, and thus the cooling fluid may be frequently supplied to the cooling tower.

Accordingly, according to the present disclosure, costs for water supply for operating the fuel cell power generation system may be reduced.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

The invention claimed is:

1. A fuel cell cooling system comprising:
   a fuel cell module including a fuel cell stack;
   a cooling module including a cooling tower in which cooling fluid is accommodated, the cooling module being configured to adjust a temperature of the fuel cell module;
   a heat exchanger configured to exchange heat between first circulation cooling water circulating in the fuel cell module and second circulation cooling water circulating in the cooling tower;
   a condensate supply line connected to the cooling tower to supply, to the cooling tower, water generated in a power generation process of the fuel cell module;

a cooling pump configured to adjust a flow rate of the water supplied to the cooling tower; and
a controller configured to control operation of the cooling pump;
wherein the fuel cell module further includes a first cooling water line through which the first circulation cooling water for adjusting a temperature of the fuel cell stack circulates;
wherein the cooling module further includes a second cooling water line through which second circulation cooling water cooled by the cooling fluid circulates; and
wherein the second cooling water line includes:
an inlet line provided such that the second circulation cooling water heat-exchanged by the heat exchanger is introduced into the cooling tower and having a first temperature sensor; and
an outlet line provided such that the second circulation cooling water cooled by the cooling tower is discharged to the heat exchanger and having a second temperature sensor; and
wherein the controller controls the operation of the cooling pump by comparing a difference value between a first temperature measured by the first temperature sensor and a second temperature measured by the second temperature sensor.

2. The fuel cell cooling system of claim 1, further comprising:
a wet air discharge line configured to discharge wet air generated by the fuel cell module; and
an air exhaust line through which air in the wet air is exhausted;
wherein the air exhaust line and the condensate supply line branch off from the wet air discharge line.

3. The fuel cell cooling system of claim 2, wherein the air exhaust line includes:
an upward extension line extending upward from the wet air discharge line; and
two or more branching parts branching off to be inclined upward from an upper end of the upward extension part.

4. The fuel cell cooling system of claim 2, wherein one end of the condensate supply line is connected to the wet air discharge line and an other end of the condensate supply line is connected to the cooling water, and the other end of the condensate supply line is formed at a height that is lower than the one end of the condensate supply line.

5. The fuel cell cooling system of claim 1, further comprising:
a condensate supplier including the condensate supply line;
wherein the condensate supplier further includes a condensate pump positioned on the condensate supply line, the condensate pump being configured to adjust a flow rate of a condensate supplied to the cooling tower.

6. The fuel cell cooling system of claim 1,
wherein the heat exchanger is connected between the first cooling water line and the second cooling water line and is configured to exchange heat between the first circulation cooling water and the second circulation cooling water.

7. The fuel cell cooling system of claim 6, further comprising:
a condensate supplier including the condensate supply line and the cooling pump;
wherein the condensate supplier further includes:
a cooling tank installed on the condensate supply line and configured to store water discharged from the fuel cell module; and
wherein the cooling pump provided on the condensate supply line is positioned, between the cooling tank and the cooling tower.

8. The fuel cell cooling system of claim 7, wherein the condensate supplier further includes a water level sensor configured to measure a water level of the condensate stored inside the cooling tank, and
the controller receives a signal measured by the water level sensor and operates the cooling pump when the water level measured by the water level sensor exceeds a reference water level range that is a preset water level range.

9. The fuel cell cooling system of claim 1, wherein the controller operates the cooling pump to supply the condensate to the cooling tower when the difference value between the first temperature and the second temperature deviates from a reference temperature range that is a preset temperature range.

10. The fuel cell cooling system of claim 1, wherein the cooling tower includes a cooling fluid drain line which is formed at a predetermined height of the cooling tower, and through which at least a portion of the cooling fluid is discharged to an outside of the cooling tower when a water level of the cooling fluid accommodated in the cooling tower exceeds a predetermined range.

* * * * *